Dec. 19, 1961  F. S. ALLINQUANT  3,013,811
TRIM CORRECTOR DEVICE FOR A VEHICLE WITH FLUID SUSPENSION
Filed June 28, 1960  2 Sheets-Sheet 1

FIG. I

INVENTOR:
FERNAND STANISLAS ALLINQUANT

BY *Robert Henderson*
ATTORNEY

United States Patent Office 3,013,811
Patented Dec. 19, 1961

3,013,811
TRIM CORRECTOR DEVICE FOR A VEHICLE
WITH FLUID SUSPENSION
Fernand Stanislas Allinquant, 6 à 10 Rue Olier,
Paris, France
Filed June 28, 1960, Ser. No. 39,306
Claims priority, application France July 31, 1959
6 Claims. (Cl. 280—124)

For varying the bearing force of the suspension of a vehicle having elements comprising a fluid under pressure, that is to say, for regulating in such suspension the height of the suspended masses relatively to the non-suspended masses, it has already been proposed to inject or withdraw fluid at a suitable point of the elements of the suspension.

The injection of fluid may be effected in various ways, for example by means of distributors from reservoirs previously under pressure, or by the starting of pumps or compressors.

The fluid may be exhausted into the open air or into an appropriate reservoir, and this exhausting may or may not necessitate the starting of a motor.

More particularly, in the United States patent application filed in the name of the applicant on November 18, 1958 No. 774,751 for "Vehicle suspension system having a pneumatic member and a device for correcting trim," now Patent No. 2,987,312, dated June 6, 1961, a device is described in which the fluid is transferred in one direction from a chamber of variable volume to a chamber of fixed volume by means of a compressor, and in the other direction by means of valves.

These devices may be operated manually or automatically and more particularly they may be made dependent on the height of the vehicle so as to maintain this height constant, despite load variations, the controls being advantageously electrical.

Manual correction presupposes a correct appreciation of the height of the vehicle or the utilisation of an indicating device. Experience has shown that it is difficult for a driver of little practice to utilise it properly.

Automatic correction has the disadvantage of employing expensive time relays and hypothetically of operating more frequently than is strictly necessary, thus involving power consumption and wear of contacts.

The device according to the present invention is semi-automatic, making it possible in particular to remedy the aforesaid disadvantages.

It comprises two paths of flow in opposite directions for the fluid, one permitting evacuation of the fluid from the active parts of the suspension and therefore the diminution of the bearing force of the latter, and the other permitting the introduction of fluid under pressure, and consequently, an increase in the bearing force. It is characterised in that these two paths, which have unequal flows, are put into activity simultaneously by a control of the user, the action of the path of greater flow being, however, controlled by means detecting the position of the suspended part of the vehicle relatively to the non-suspended part, so that this path only acts if the latter part goes beyond a certain limit corresponding to the correct position. The suspended part thus makes an oscillation of small amplitude about the correct position, and the device is completed by means signalling this oscillation to the user, who can then put the said device out of action.

In an advantageous embodiment, one of the paths comprises a compressor driven by a motor which draws fluid from the suspension and forces it under higher pressure into a reservoir, while the other of greater flow comprises electrically operated valves, which re-introduce the fluid from this reservoir into the suspension when they are energised by the closure of electrical contacts on the moving together of the suspended part and the non-suspended part.

The following description with reference to the accompanying drawings, given by way of example only, will make it clear how the invention can be carried into effect.

Figure 1:
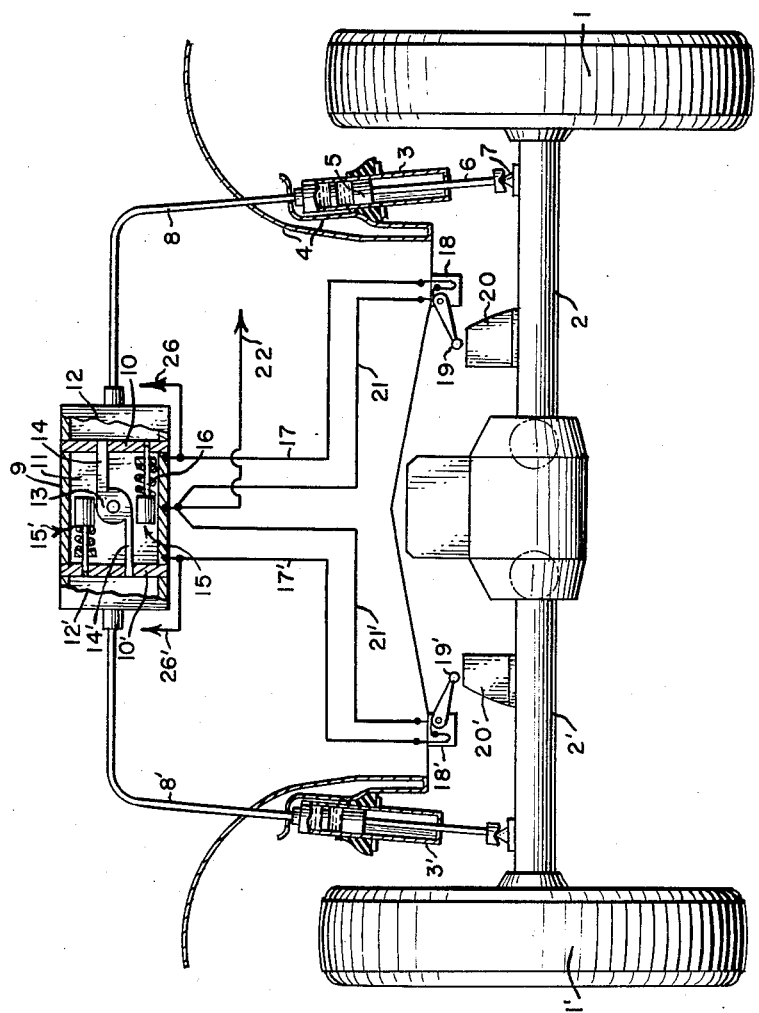
FIG. 1 is a diagrammatic view, partially in section, of a trim corrector device embodying the invention, associated with the suspension elements of the set of back wheels of the vehicle.

FIG. 1 represents very diagrammatically the back wheels of a motor vehicle, the right-hand back wheel 1 being carried by a stub axle 2, and the left-hand back wheel 1' by a stub axle 2'.

Associated with each of these stub axles, taking for example that of the right-hand back wheel, is a telescopic suspension element, comprising a cylinder 3 fixed to the frame 4 of the vehicle, and in which slides a piston 5, the rod 6 of which is pivoted at 7 to the stub axle 2. The cylinder contains oil serving as damping medium for the movements of the piston, and above this oil, a gas under pressure such as compressed air, serving as a resilient suspension element. The top of the cylinder containing compressed air is connected by a pipe 8 to a box 9, into which opens also a pipe 8' connected to the top of the cylinder 3' of the suspension element associated with the left-hand wheel 1'.

Two transverse partitions 10 and 10' define three compartments in the interior of the box 9, namely a central enclosure 11 and two side chambers 12 and 12', into which open the pipes 8 and 8' respectively, and each of which completes the volume of the enclosure reserved for the compressed air in the cylinder of the corresponding suspension element.

In the enclosure 11, a compressor 13 of any type, for example one of those described in the specification of the aforesaid patent application and driven by an electric motor (not shown), draws through conduits 14—14' air situated in each of the lateral chambers 12—12' and forces this compresed fluid into the interior of the enclosure 11. Electrically operated valves 15—15' control passages provided in the walls 10—10' and put the central chamber 11 into communication with the side chambers 12 and 12', respectively. On each of these electrically operated valves a spring 16 constantly urges the valve needle towards the position closing the communication between the central chamber and the side chambers.

Each of the electrically operated valves is connected by a lead 17—17' to a micro-switch 18—18', which is fixed to the vehicle frame and the operating feeler 19—19' of which co-operates with a cam 20—20' fixed, for example, to the corresponding stub axle or to any other member which follows the variations in position of the associated wheel.

Figure 2:
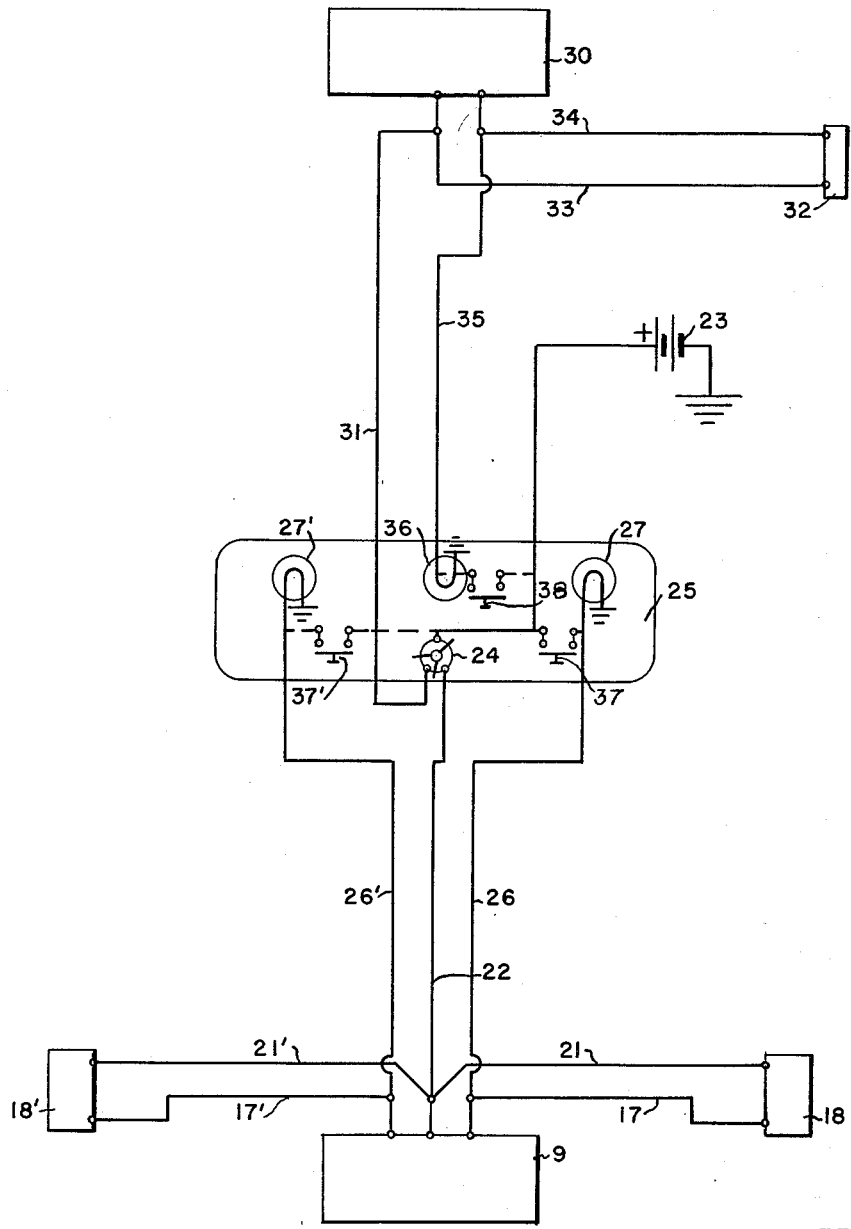
FIG. 2 is a diagram showing the electrical circuit of the trim corrector device associated with the front and back suspension elements of a vehicle.

Each of the micro-switches is in addition connected by a lead 21—21' to a wire 22 connecting the motor of the compressor 13 to a source of current 23, for example the accumulator battery of the vehicle (FIG. 2). A switch 24, situated for example on the dash-board 25 of the vehicle, permits the circuit between the battery and the motor of the compressor to be broken.

Furthermore, a lamp 27—27', also situated on the dash-board, is connected to a wire 26—26' connected to the lead 17—17' connecting the micro-switch to the corresponding electrically operated valve.

The various circuits shown are of course single-wire circuits, their return being effected through earth according to a wiring currently used in the motor vehicle art.

The device which has just been described operates as follows. When it is desired to correct the trim of the vehicle, the contact 24 is operated, whereby the micro-switches 18—18' and the motor of the compressor 13 are connected to supply. The compressor draws fluid from the chambers 12 and 12' and forces the compressed fluid into the central chamber 11. The reduction in volume of the air above the oil of the suspension elements has the effect of causing the frame to descend relatively to the wheels.

Assuming, for example, that the frame was originally too high relatively to the suitable mean position, the feelers 19—19' of the micro-switches come into contact with the cams 20 and 20'. The frame descends until the micro-switches are closed, thus energising the electrically operated valves originally in the normal closure position. The valve members of the electrically operated valves are lifted off their seats, putting into communication the chamber 11 with the chambers 12—12' so that, the pressure of the compressed fluid being higher in the enclosure 11 than in the chambers 12—12', the said fluid will pass into the lateral chambers. The delivery of the valves, however, is selected so as to be much higher than that furnished by the compressor, so that the volume of air above the oil of the suspension element is increased.

The frame is therefore lifted again until the feelers 19—19' leave the corresponding cams. At this moment, the micro-switches open the circuits of the electrically operated valves which are no longer energised, the communication between the central chamber and the side chambers of the box 9 is interrupted and the compressor draws air, so that the frame re-descends relatively to the wheels. The same succession of operations then continues and the frame oscillates about a mean position.

As the lamps 27—27' light up each time the electrically operated valves are energised, there is a flashing of said lamps, corresponding to the oscillatory movement of the frame about its mean position, determining correct trim. The user of the vehicle then knows that the adjustment is terminated and that he can open the switch 24.

It would furthermore be possible to provide the known connection of an automatic time switch in the electrical circuit, so as to interrupt the supply to the motor and to the electrically-operated valves after a certain number of oscillations.

A device similar to that which has just been described may be provided for the front suspension elements. This is shown in FIGURE 2, in which 30 denotes a box similar to 9, containing a motor driving a compressor and an electrically-operated valve (not shown). A lead 31 connects the motor to the contact 24, and the input circuit of a micro-switch 32 is provided by a wire 33 connected to the lead 31, the return being, of course, by earth. The output of the micro-switch is connected by a lead 34 to the electrically-operated valve of the box 30. Connected to this output of the micro-switch, which forms the input of the electrically-operated valve, is a wire 35 for the supply of a lamp 36, likewise mounted on the dash-board 25.

The operation of this circuit is identical to that explained hereinbefore, assuming of course that the micro-switch 32 is controlled by a member (for example a cam, not shown) sensitive to the position of the frame relatively to the front set of wheels of the vehicle.

An initial adjustment permits a correct trim to be given to the whole of the frame. The corrections of trim by means of the motors and electrically-operated valves are effected from time to time at will, for example for variations of the load applied to the vehicle or for variations of temperature, etc.

In certain cases, however, it may be advantageous to lift the frame to the maximum relatively to the wheels. It then suffices to provide a direct connection between the output of the battery 23 and the input of the electrically-operated valves so as to shunt the micro-switches, assuming of course that there is a sufficient reserve of compressed air in the central chamber 11. This connection may be made between the source of current and the leads to which are connected the lamps 27—27' and 36. This arrangement is shown by a broken line in FIG. 2, push-buttons 37—37' and 38 being of course provided for braking these circuits at will.

The device according to the invention provides the possibility of closing and opening the motor circuit by means of a robust manually-operated switch, while dispensing with an automatic control circuit for the motor. The operation is therefore quite semi-automatic, starting of the regulation being effected at the desire of the user by operating the switch 24, the operations taking place automatically once the circuit is connected for obtaining a correct trim.

This arrangement has the advantage of not necessitating a delay in the circuit of the electrically-operated valves, the rapid operation of which does not present any electrical or mechanical inconvenience, due to the very low currents and the very small inertias involved.

A clearly visible indication is obtained as soon as the correct height of the frame has been reached by the flashing of the signal lamps, which indicates when the arrangement should be put out of circuit. In addition, the power consumption is limited to the period of operation. Finally, prolonged operation has no disadvantage other than that of involving a power consumption.

It should be noted that the device will only operate if the action of the discharge valves of the electrically-operated valves is definitely predominant relatively to that of the motor, which is the case in practice. A large difference in air flow furthermore leads more rapidly to a correct trim. The motor can then operate quite safely in a continuous manner during the entire regulating operation.

Modifications may of course be made in the embodiment which has just been described, more particularly by substitution of equivalent technical means, without departing from the scope of the present invention.

Thus, for example, the same arrangement may be applied to current systems, in which a pump injects fluid into the suspension elements, while electrically-operated valves permit such fluid to be withdrawn.

What I claim is:

1. Trim corrector device for a vehicle with fluid suspension, comprising at least two suspension elements between a suspended part and a non-suspended part of the vehicle, pipes connecting the suspension elements to an enclosure, a reservoir in said enclosure, a compressor drawing fluid from the suspension elements by said pipes and forcing it under higher pressure into said reservoir, electrically-operated valves for putting said reservoir and enclosure into communication and consequently for introducing fluid into said suspension elements by said pipes, said electrically-operated valves having a higher delivery than that of the compressor, electrical contacts for energising said electrically-operated valves, means effective to cause the closure of said electrical contacts and the moving together of the suspended part and the non-suspended part of the vehicle and corresponding to a correct trim, and means at the disposal of the user for putting the compressor and electrically-operated valves out of action.

2. Device according to claim 1, comprising an electrical control circuit for each of the electrically-operated valves and a signal lamp connected to each of said circuits, the lamp lighting up when the corresponding electrically-operated valve is operated.

3. Device according to claim 2, comprising in addition means for effecting manual shunting of said contacts, by separate control, for bringing the frame into a high position.

4. Device according to claim 1, in which the said contacts are micro-switches, and comprising cams fixed to a member carrying the wheels and co-operating with feelers carried by said micro-switches.

5. Trim corrector for a vehicle with fluid suspension, comprising suspension elements between a suspended part and a non-suspended part of the vehicle, a discharge path from said suspension elements and means for controlling the discharge of fluid through said path for diminishing the bearing force of the suspension, an introduction path to said suspension elements and means for controlling the introduction of fluid under pressure through said introduction path for increasing the bearing force of the suspension, said two paths having unequal flows, detection means for detecting the position of the suspended part of the vehicle relatively to the non-suspended part of the vehicle, actuating means under the control of said detection means for actuating said controlling means which control the path having the greater flow when the suspended part is below a limit corresponding to a correct position, a control at the disposal of the user for energizing both said detection means and said controlling means which control the path having the smaller flow, whereby the two paths are active with unequal flows when the suspended part is below said limit while only the path having the smaller flow is active when the suspended part is above said limit so that the suspended part makes an oscillatory movement of small amplitude about the correct position.

6. A device according to claim 5, comprising, in addition, means for signaling the oscillation of the suspended part to the user, who, according to the frequency of the oscillatory motion, can determine when a substantially correct position of the suspended part is reached and then put the two paths out of action.

References Cited in the file of this patent
UNITED STATES PATENTS
2,907,578     Taber ------------------ Oct. 6, 1959